(12) United States Patent
Logan

(10) Patent No.: US 7,858,258 B2
(45) Date of Patent: Dec. 28, 2010

(54) CASCADED FUEL CELL STACK OPERATION WITH ANODE GAS RECIRCULATION

(75) Inventor: Victor W. Logan, Naples, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1335 days.

(21) Appl. No.: 11/367,156

(22) Filed: Mar. 3, 2006

(65) Prior Publication Data

US 2007/0207353 A1 Sep. 6, 2007

(51) Int. Cl.
*H01M 8/04* (2006.01)
*H01M 2/00* (2006.01)

(52) U.S. Cl. .................. 429/445; 429/414; 429/435; 429/467

(58) Field of Classification Search .............. 429/22
See application file for complete search history.

(56) References Cited

U.S. PATENT DOCUMENTS

| 5,478,662 A | 12/1995 | Strasser |
|---|---|---|
| 6,251,534 B1 * | 6/2001 | McElroy ............ 429/13 |
| 6,569,549 B1 | 5/2003 | Sawyer |
| 6,794,068 B2 | 9/2004 | Rapaport et al. |
| 6,821,668 B1 | 11/2004 | Perry et al. |
| 2001/0036566 A1 * | 11/2001 | Dekker et al. ............ 429/19 |
| 2003/0039870 A1 * | 2/2003 | Busenbender ............ 429/13 |
| 2004/0161657 A1 * | 8/2004 | Simpson et al. ............ 429/38 |
| 2004/0166383 A1 * | 8/2004 | Schafer ............ 429/13 |
| 2006/0127709 A1 * | 6/2006 | Bai et al. ............ 429/13 |

OTHER PUBLICATIONS

Pump. (n.d.) The American Heritage® Dictionary of the English Language, Fourth Edition. (2003). Retrieved Feb. 2, 2010 from http://www.thefreedictionary.com/pump.*

\* cited by examiner

*Primary Examiner*—Keith Walker
(74) *Attorney, Agent, or Firm*—Dinsmore & Shohl, LLP

(57) ABSTRACT

A device and method to regulate humidification in a cascaded fuel cell stack. The cascaded fuel cell stack includes individual fuel cells placed together in multiple groups. A recirculation loop is fluidly coupled to an anode flowpath to permit the recirculation of hydrogen or a related fuel. A controller and one or more sensors and flow manipulation devices cooperate with one another to selectively increase or decrease the flow of reactant in the recirculation loop in order to manage water levels in one or more of the anode, cathode or electrolyte layer disposed between the anode and cathode.

5 Claims, 5 Drawing Sheets

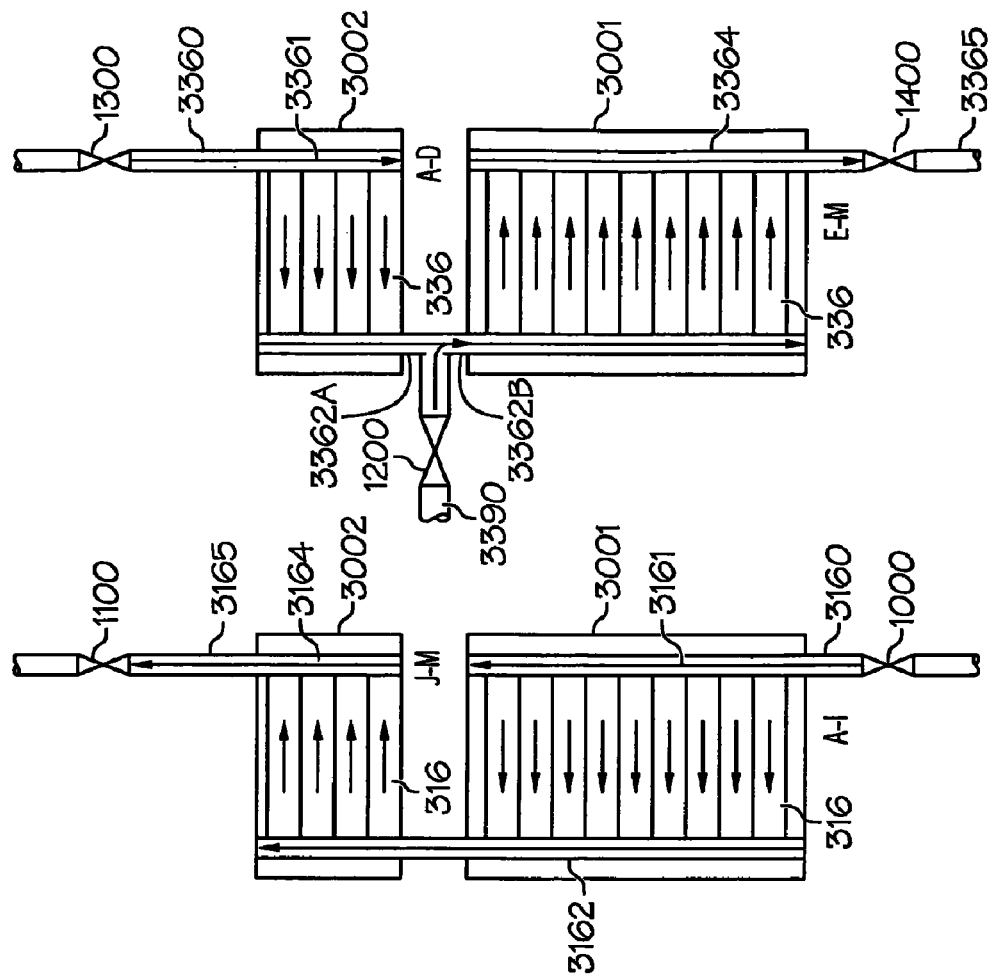
FIG. 4
FIG. 3
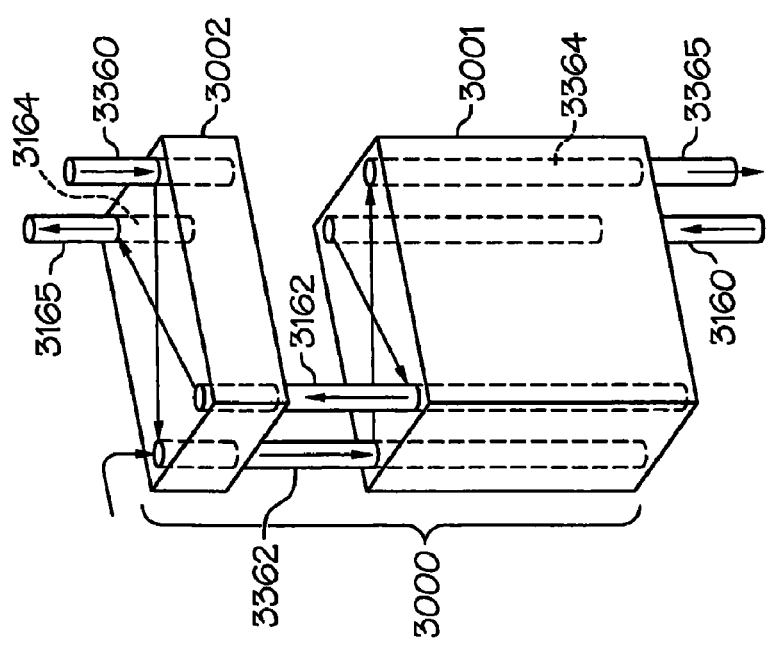
FIG. 2

CASCADED FUEL CELL STACK OPERATION WITH ANODE GAS RECIRCULATION

BACKGROUND OF THE INVENTION

The present invention relates generally to humidification of a fuel cell, and more particularly to recirculating fluid in a fuel cell anode flowpath to control the level of humidification within a cascaded fuel cell stack.

In a typical fuel cell system, hydrogen or a hydrogen-rich gas is supplied through a flowpath to the anode side of a fuel cell while oxygen (such as in the form of atmospheric oxygen) is supplied through a separate flowpath to the cathode side of the fuel cell. In one form of fuel cell, called the proton exchange membrane (PEM) fuel cell, an electrolyte in the form of a membrane is sandwiched between the anode and cathode to produce a layered structure commonly referred to as a membrane electrode assembly (MEA). Each MEA forms a single fuel cell, and many such single cells can be combined to form a fuel cell stack, increasing the power output thereof. The humidity level in and around the MEA must be controlled to ensure proper fuel cell operation. Water produced during the electrochemical reaction of hydrogen and oxygen, as well as humidification of these reactants prior to their introduction into the fuel cell, can be used to effect such humidity control.

In a conventional single-pass fuel cell stack arrangement, fuel is distributed through a common manifold in a substantially concurrent fashion to each fuel cell in the stack such that each hydrogen-bearing flowpath receives approximately the same concentration of fuel. One disadvantage of such a configuration is that it is difficult to realize thorough reactant utilization. To improve the fuel efficiency, the stack can be arranged as a cascade (also referred to as a multi-pass fuel cell), where the individual cells are divided up into multiple groups (or stages) such that the reactants are supplied concurrently within each group and sequentially between groups. Cascaded fuel cells have the advantage of requiring a lower overall stoichiometry in the anode portion of a fuel cell stack, as smaller quantities of fuel are required to achieve the same useful power output, thereby promoting more efficient operation. As with traditional fuel cell configurations, it is desirable to minimize the number of groups in cascaded fuel cells to simplify and reduce the amount of ancillary equipment (including sensors and flow control componentry). In addition, having fewer groups reduces the likelihood of fuel concentration imbalance in the latter groups, where fuel concentration tends to decrease under the reactions of each successive stage.

One difficulty associated with cascaded fuel cells with a small number of stages (for example, two) is that prohibitively high anode flow is required to ensure adequate hydration levels in the membrane and cathode. One method of meliorating some of these hydration deficiencies is by external humidification, including condensers, water injection and separate water reservoirs. Shortcomings of external humidification approaches include freeze complications in cold environments, as well as greater system complexity associated with the additional componentry. Another approach involves placing more than the stoichiometric amount of fuel in the anode flowpath. While this is helpful in increasing water levels in the membrane, it has the disadvantage of dumping excess fuel overboard, thereby lowering the very utilization that cascaded systems were created to improve.

Still another potential method of ensuring adequate levels of hydration includes humidifying one or both of the reactants before they enter the fuel cell with a water vapor transfer device. In such a device, the water produced at the moisture-rich later stages of the cathode can be extracted and reintroduced (typically in vapor form) into portions of the anode flowpath, cathode flowpath or both where there is little or no moisture. Fibrous tubes, water-permeable membranes or similar devices capable of providing capillary or related water transfer action can be used to effect the transfer of moisture from one stream to the other, but can significantly add to the cost of the system. In addition, measuring and controlling water vapor transfer device humidity output has proven to be difficult.

Efficient operation of a fuel cell system employing one of the approaches discussed above is further hampered when the system requires a source of power to operate. These and other disadvantages are especially troublesome for vehicle-based fuel cell applications, as the often redundant componentry would take up precious vehicle space otherwise used for passenger, comfort or safety features, while the reductions in overall system efficiency impact cost savings. Accordingly, there exists a need for an integrated approach to hydrating a cascaded fuel cell to avoid the cost, complexity or operability associated with other supplemental or traditional humidification approaches.

BRIEF SUMMARY OF THE INVENTION

These needs are met by the present invention, wherein a cascaded fuel cell system and a method of operating the system that incorporates the features discussed below are disclosed. In accordance with a first aspect of the present invention, a fuel cell stack assembly includes a stack divided up into numerous groups of individual fuel cells arranged in a cascade. The fuel cells within each group include a membrane electrode assembly, anode flowpath and cathode flowpath. In addition to the cells being arranged into cascaded groups of the stack, the assembly includes a cooling loop, recirculation loop and a means for controlling the operation of the stack. By providing a recirculation loop in the anode flowpath, and coupling the anode flowpath recirculation with balance-of-plant (BOP) components (which may include valves, pumps, conduit, radiator circuits or the like) that are responsive to algorithm-based controllers that are in turn coupled to parameter-measuring sensors, the humidification benefits associated with placing greater than stoichiometric flow in one or more parts of the anode flowpath can be realized without the cost, complexity or efficiency-robbing fuel utilization penalty associated with the prior art.

Optionally, the recirculation loop is in heat exchange relationship with the cooling loop such that coolant can be used to control the relative humidity in the cathode exhaust. In this way, cold fuel coming into the anode does not condense the hot, humidified water in the recirculation stream. Preferably, the desired relative humidity of the cathode exhaust can be determined from other parameters, such as a membrane water hold up model discussed in U.S. patent application Ser. No. 11/130,807 entitled MANAGEMENT VIA DYNAMIC WATER HOLDUP ESTIMATOR IN A FUEL CELL, filed May 15, 2005, assigned to the Assignee of the present invention and hereby incorporated by reference. Control of the relative humidity within a range is helpful, as with too little humidity, the membrane dries out and the resistance becomes unacceptably high, while with too much humidity, the flow of reactants through the anode and cathode (especially through the diffusion layers thereof) becomes too difficult, as it presents mass transport problems. The flow manipulation device may include one or more pumps, valves or combination thereof. In one form, the assembly is made up of two groups within the stack. In this way, a water flow rate between the anodes of the first and second of the groups is substantially sufficient to maintain adequate membrane hydration for the cells in the second anode stage. The stack assembly may include an additional oxygen source fluidly coupled to the cathode flowpath between the groups. Such supplemental air adds oxygen to the exhaust of the first stage cathode to feed the second cathode stage. This is done to avoid passing all the air for the stack through the first stage, as such an excessive flow in the first stage would result in a high pressure drop and a very dry inlet. Typically, this additional oxygen source is pressurized. In one embodiment, a vehicle can be made to operate with the stack such that the stack serves as a source of motive power for the vehicle.

According to another aspect of the invention, a cascaded fuel cell stack includes numerous individual fuel cells defining two fuel cell groups. Each of the individual fuel cells includes a membrane electrode assembly, an anode, an anode flowpath fluidly coupled to the anode, a cathode and a cathode flowpath fluidly coupled to the cathode. The first group is made up of some of the individual fuel cells, while the second group is made up of the remainder. Both the first and second groups are arranged such that the anode flowpath and the cathode flowpath are in counterflow relationship relative to one another. The cascaded nature of the stack construction means a substantially parallel delivery of reactants to each of the flowpaths. In this way, the concentration of reactant delivered to each of the individual fuel cells is substantially equal. The first group is arranged such that the inlet for the anodes is fluidly coupled to a fuel source while the inlet for the cathodes is fluidly coupled to the cathode outlet of the second group. The second group is arranged such that the anode inlet for this second group is fluidly coupled to the first group anode outlet, while the cathode inlet of the second group is fluidly coupled to an oxygen source. As with the previous aspect, a cooling loop is thermally coupled to the stack, while a recirculation loop is fluidly coupled to the anode flowpath. A controller cooperates with the recirculation loop such that upon receipt of at least one signal corresponding to an operational condition of the stack, the controller can direct one or more flow manipulation devices to produce a desired anode water flow between the first and second groups. Controlling the water hold-up is helpful in determining where the water is, which is in turn valuable in proper hydration.

According to another aspect of the invention, a method of operating a fuel cell system is disclosed. The method includes configuring the system to include a cascaded fuel cell stack similar to one of the previously-described aspects, introducing fuel into the anode flowpath and oxygen into the cathode flowpath, sensing one or more parameters associated with the flow of one or both of the fuel and the oxygen reactants, determining an operational set point in the controller based on the sensed parameter(s), and manipulating the flow of the fuel, oxygen, coolant or combination thereof to produce a desired water balance.

Optionally, within each of the groups, the oxygen flowing through the cathode flowpath is in counterflow relationship with the fuel flowing through the anode flowpath. The fuel flowing through the anode recirculation loop is a fraction of the total fuel flow through the anode flowpath, and through proper manipulation (as well as through changing power level demands on the stack), the percentage of total fuel flow that gets recirculated can be varied. Thus, by controlling a fuel flow rate through the anode recirculation loop relative to a total rate of flow of fuel flowing through the anode flowpath, a predetermined molar flow rate of water through the stacks can be accomplished. Furthermore, the determination of an operational set point in the controller is used to determine coolant temperature entering and exiting the stack. In addition, the sensing comprises sensing at least one pressure in the cathode flowpath. More particularly, this includes sensing pressures downstream the exit of, in between the first and second groups of and upstream of entrance into the stack. The method further comprises regulating pressure in the anode flowpath to substantially correspond to the sensed pressures in respective portions of the cathode flowpath. Thus, where the stack exhaust pressure in the cathode flowpath is measured to a certain value, the stack exhaust pressure in the anode flowpath is manipulated to correspond to the cathode value. Similarly, the anode flowpath is biased to produce the corresponding intergroup pressure as that of the intergroup cathode flowpath, while the same is done to the anode flowpath inlet into the stack. By having the anode pressure values correspond or be biased to the respective cathode values does not necessitate that the values be equal, merely that there be a ratio between the two that can be maintained in order to allow the controller to attain a preferred set point. In one example, determining an operational set point in the controller comprises determining a temperature of coolant being introduced into the stack. The method may further determine a temperature of coolant being exited from the stack. In another option, the first group comprises a greater number of individual cells than the second group. In yet another option, an anode bleed valve and recirculation pump can be manipulated to nitrogen buildup and control reactant flow through the anode flowpath.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which:

FIG. 2 shows schematically the anode and cathode flow through a cascaded fuel cell stack according to an embodiment of the present invention;

FIG. 3 shows a simplified internal view of the anode flowpath through the stack of FIG. 2;

FIG. 4 shows a simplified internal view of the cathode flowpath through the stack of FIG. 2;

DETAILED DESCRIPTION OF THE PREFERRED EMBODIMENTS

Figure 1A:
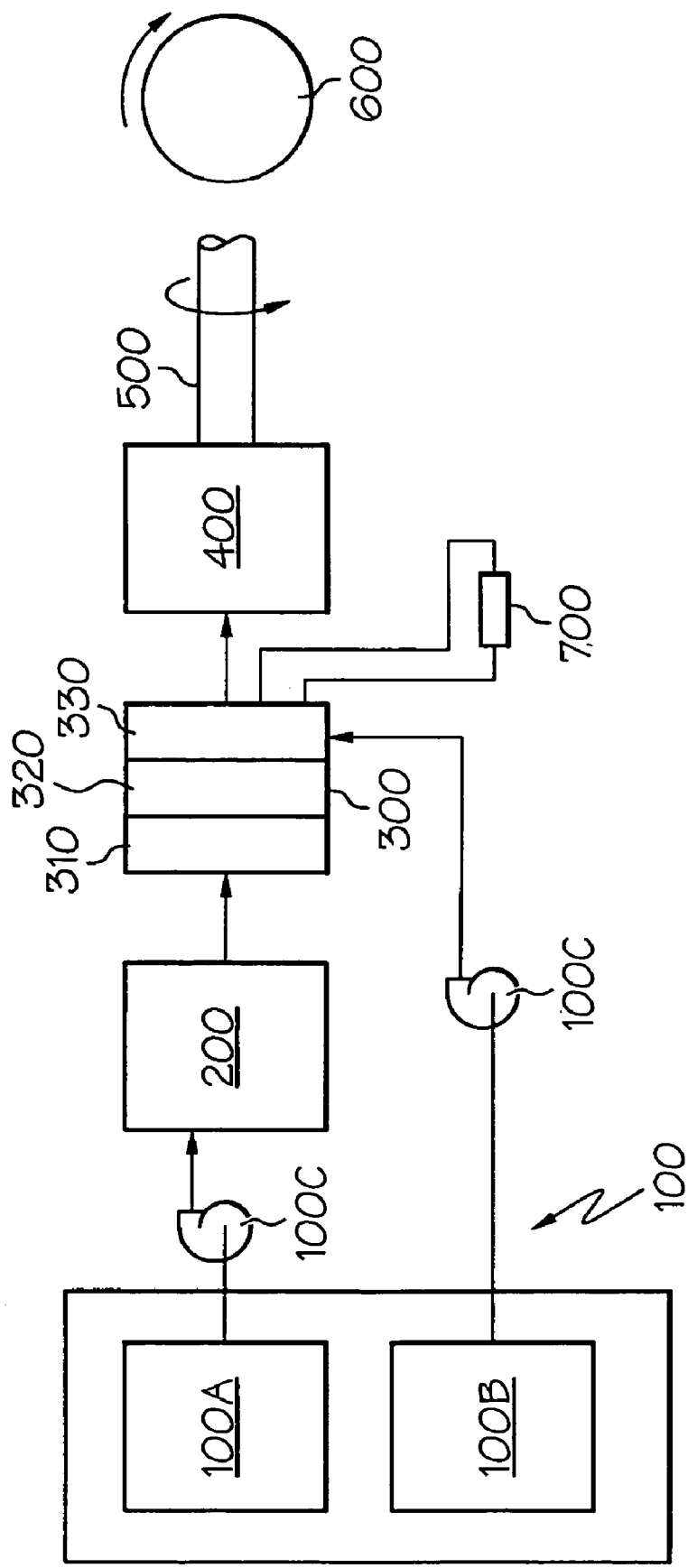
FIG. 1 shows a block diagram of a fuel cell system configured for vehicular application.
Figure 1B:
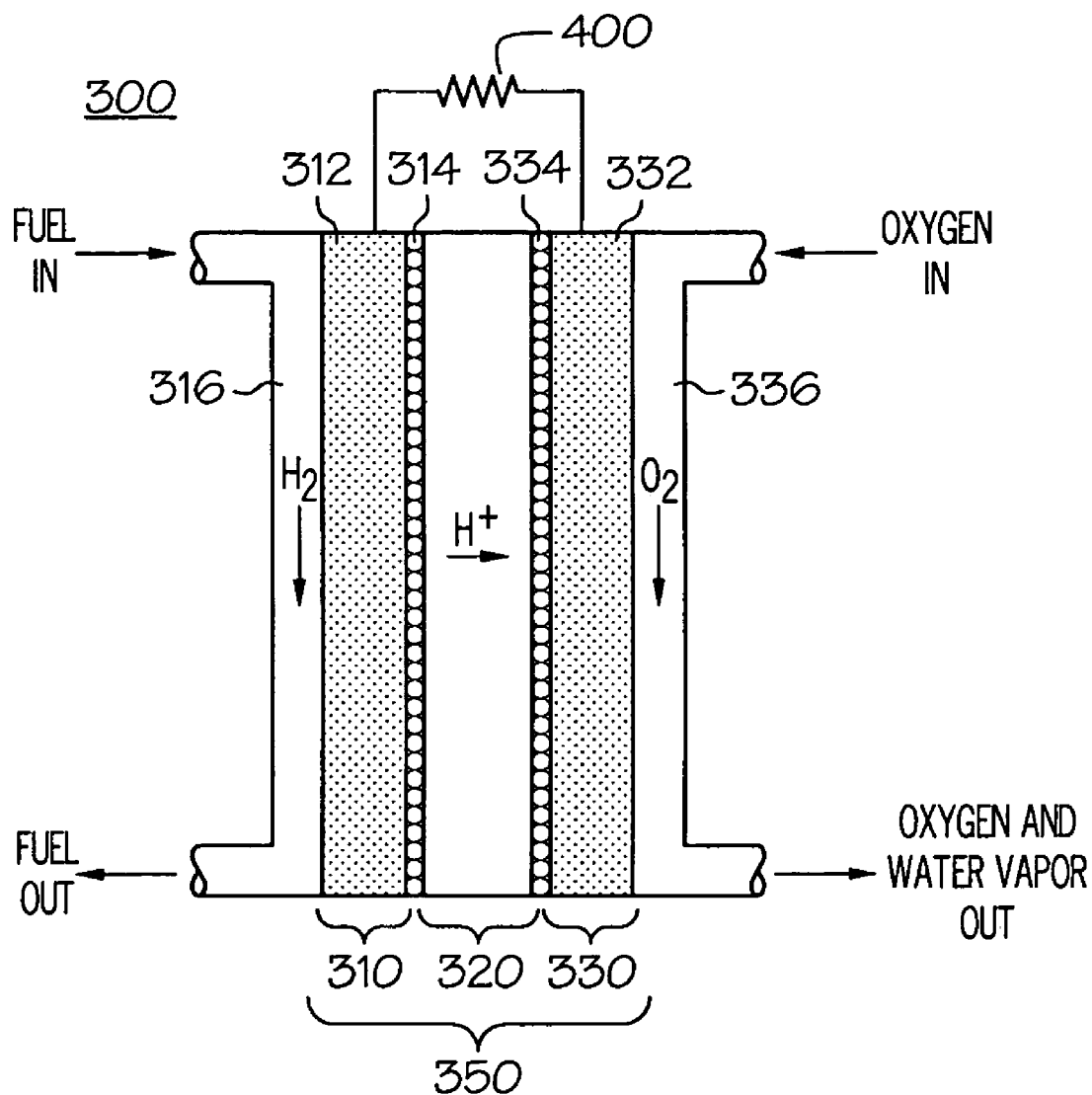
Figure 5:
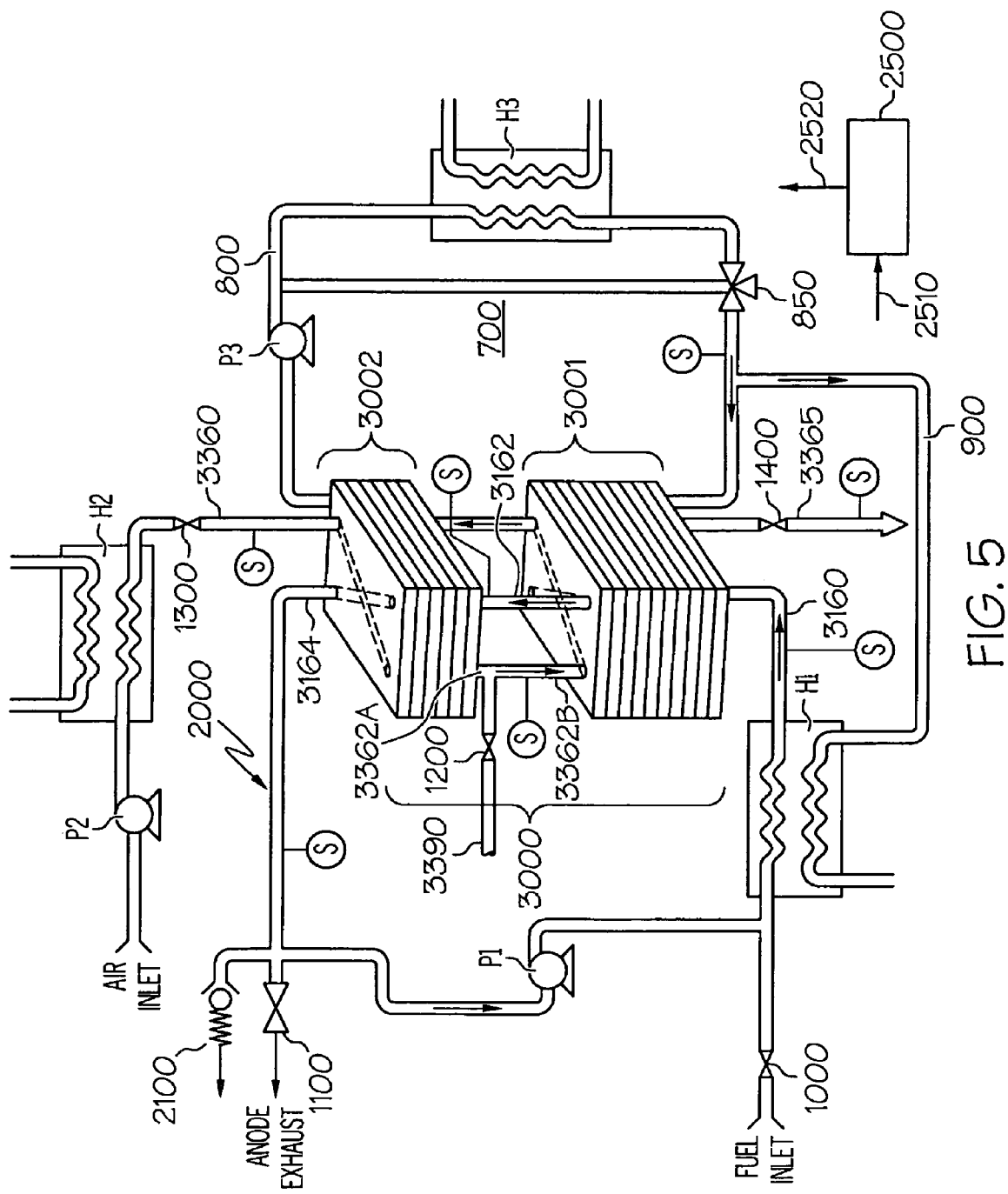
FIG. 5 shows the anode recirculation loop integrated into the major flowpaths of a two stage fuel cell stack.
Figure 6:
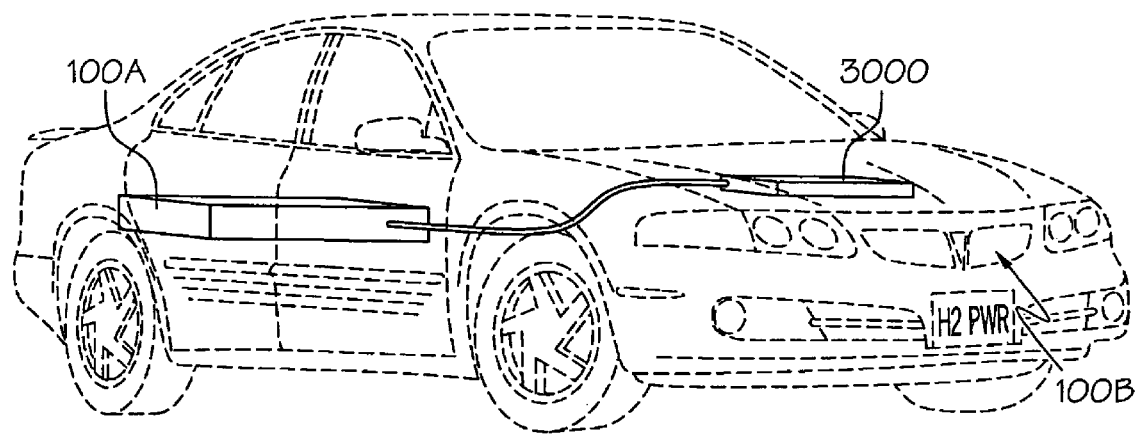
FIG. 6 shows a vehicle employing the fuel cell system of the present invention.

Referring initially to FIGS. 1A, 1B and 5, a block diagram highlights the major components of a mobile fuel cell system 1 according to the present invention (FIG. 1), as well as a representative placement of a fuel cell system into an automotive application (FIG. 5). Referring with particularity to FIG. 1A, the system 1 includes a reactant delivery system 100 (made up of fuel source 100A, oxygen source 100B and one or more compressors 100C), fuel processing system 200, fuel cell 300, one or more energy storage devices 400, a drivetrain 500 and one or more motive devices 600, shown notionally as a wheel. A cooling system 700 (as will be described in more detail below) is connected to the fuel cell 300 to facilitate thermal management thereof. It will be appreciated by those skilled in the art that not every system may require a compressor. For example, in configurations where one or both of the fuel or oxygen sources 100A, 100B are supplied via pressurized tank or related container, such compressors may be dispensed with. While the present system 1 is shown for mobile (such as vehicular) applications, it will be appreciated by those skilled in the art that the use of the fuel cell 300 and its ancillary equipment is equally applicable to stationary applications. It will further be appreciated by those skilled in the art that the term "fuel cell", while generally indicative of a single fuel cell within a larger stack of such cells, may also be used to define the stack. Such usage will be clear, based on the context.

The fuel processing system 200 may be incorporated to convert a raw fuel, such as methanol into hydrogen or hydrogen-rich fuel for use in fuel cell 300; otherwise, in configurations where the fuel source 100A is already supplying substantially pure hydrogen, the fuel processing system 200 may not be required. The energy storage devices 400 can be in the form of one or more batteries, capacitors, electricity converters, or even a motor to convert the electric current coming from the fuel cell 300 into mechanical power such as rotating shaft power that can be used to operate drivetrain 500 and one or more motive devices 600.

Referring with particularity to FIG. 1B, fuel cell 300 includes an anode 310, cathode 330, and an electrolyte 320 disposed between anode 310 and cathode 330. The anode 310 includes a generally porous electrode substrate 312 (also referred to as a diffusion layer) and catalyst layer 314 connected to an anode flowpath 316. The cathode 330 includes a generally porous electrode substrate 332 (also referred to as a diffusion layer) and catalyst layer 334 connected to a cathode flowpath 336. Together, the substrates 312, 332, catalyst layers 314, 334 and electrolyte 320 define an MEA 350. Anode and cathode flowpaths 316, 336 (which may be formed, for example, as grooves in a bipolar plate (not shown) contact their respective anode and cathode to allow delivery of the appropriate reactants. Fuel (typically in the form of gaseous hydrogen) comes in contact with a catalyst (such as platinum or a related noble metal) on the catalyst layer 314 of anode 310. Electrochemical oxidation of the hydrogen fuel proceeds by what is believed to be a dissociate adsorption reaction facilitated by the catalyst. The positively-charged hydrogen ion (proton) produced at the anode 310 then passes through the electrolyte 320 to react with the negatively-charged oxygen ions generated at the cathode 330. The flow of liberated electrons from the ionization of the fuel sets up a current through an external circuit that may include the energy storing devices or other load 400 such that a motor or related current-responsive device may be turned. Although only a single fuel cell 300 is shown in FIG. 1, it will be appreciated by those skilled in the art that fuel cell system 1 (especially those for vehicular and related applications) may be made from a stack 3000 (shown in FIGS. 2 through 4) of such cells serially connected. It will further be appreciated that while the present invention is especially applicable to PEM fuel cells, the use of other fuel cell configurations with the present invention is also within the purview of the present disclosure.

Referring next to FIGS. 2 through 4, schematic and internal views of a cascaded fuel cell stack 3000 according to an embodiment of the present invention are shown. The stack 3000 includes two separate groups 3001 and 3002, each made up of one or more individual fuel cells 300 per group. As indicated before, the cascade architecture promotes higher levels of hydrogen utilization, where upstream groups of fuel cells have a larger number of individual fuel cells 300 than each successive group such that the last group contains has the fewest number of cells. The number of groups depicted in the figure is for illustrative purposes only, and although the present figure depicts two such groups, it will be appreciated that more groups can be added to the stack 3000 and are contemplated as being within the scope of the present invention. As previously discussed, to keep the complexity of ancillary system componentry to a minimum, the present inventors anticipate that the preferred number of stages may be limited to a small number such as two or three.

Referring with particularity to FIGS. 2 and 3, anode flowpath 3160 provides an inlet for hydrogen or related anode gas into the first group 3001. Anode flowpath 3160 includes an inlet manifold that distributes the reactant in a substantially equal parallel pattern to each of the individual anode flowpaths 316A-I. An outlet manifold (also referred to as the anode first group out) 3162 collects the reactant that has passed through each of the fuel cells in the first group 3001 and becomes the inlet manifold for the individual anode flowpaths 316J-M of the second group 3002; in this way, outlet manifold 3162 functions as a conduit for intergroup water flow in the anode flowpath 3160. The humidity level present in the anode flowpath 3160 (including that of outlet manifold 3162) can be varied in order to increase or decrease the level of hydration of the membrane electrode assemblies with the stack groups 3001, 3002. An anode second group out 3165 (also referred to as an anode exhaust) is downstream of an anode outlet manifold 3164 that collects the reactant that has passed through each of the fuel cells in the second group 3002. Inlet valve 1000 and anode bleed valve 1100 can be used to regulate reactant delivery, back pressure, flowpath purging or the like. Inlet valve 1000 acts as a pressure reducing feed valve. By the time the anode reactant (i.e., hydrogen) has passed through the two groups 3001, 3002 of stack 3000, its humidity level in the anode second group out 3165 is increased due to the diffusion of water, nitrogen and oxygen, the latter diffusing from the cathode to the anode and immediately reacting with the hydrogen fuel and turning into water. System operability (including power output) may eventually suffer without a recirculation loop or other device to limit the buildup or facilitate the removal of water in the anode second group out 3165. While the figures depict thirteen each of the individual anode and cathode flowpaths (four in the second stage and nine in the first), it will be appreciated by those skilled in the art that other numbers can be employed, depending upon the power output needs. For example, it is foreseeable that between one hundred and two hundred individual cells 300 may be required to produce a stack 3000 with adequate power for automotive applications.

Referring with particularity to FIGS. 2 and 4, cathode flowpath 3360 provides an inlet for oxygen or an oxygen-bearing fluid into the second group 3002. As shown with particularity in FIG. 3, the cathode flowpath 3360 is set up in a counterflow arrangement relative to the anode flowpath 3160. This counterflow arrangement has been found to be especially beneficial in promoting the passage of water between the anode and cathode flowpaths. For example, if the humidity level in the cathode reactant fluid is not too high, the counterflow arrangement will help avoid the accumulation of water in the outlet of the anode flowpath 3160 (which may otherwise arise from water diffusion across the electrolyte 320 (shown in FIGS. 1A and 1B). While the counterflow arrangement is preferred, it will be appreciated by those skilled in the art that the two flowpaths could be arranged in a co-flow relationship. Cathode flowpath 3360 includes an inlet manifold 3361 that distributes the reactant substantially equally to each of the individual cathode flowpaths 336A-D. Additional cathode reactant inlet valve 1200 can be used to selectively provide fresh reactant makeup (for example, a supplemental supply of oxygen) into an intermediate segment (described below) of the cathode flowpath 3360 to reduce the pressure drop in the individual cathode flowpaths 336A-D compared to if all of the reactant entering cathode flowpath 3360 were introduced solely at inlet manifold 3361. The use of valve 1200, as well as other valves 1000, 1100, 1300 and 1400, further allows an increase in system flexibility. For example, the cathode stoichiometry of the various stages can be increased or decreased as needed.

An intermediate manifold 3362 collects the reactant that has passed through each of the fuel cells in the second group 3002 and distributes the reactant to the individual cathode flowpaths 336E-M of the first group 3001 in a manner generally similar to that of inlet manifold 3361 for entrance in to the second group 3002. The intermediate manifold 3362 is made up of a first part 3362A and a second part 3362B, where the first 3362A represents fluid with a relative humidity that corresponds to passage through the second group 3002, and the second 3362B includes the fluid in 3362A plus fresh reactant makeup from cathode reactant inlet valve 1200 and fresh reactant supply 3390. The introduction of the fresh reactant makeup into the second part 3362B will often involve a change in the relative humidity of the fluid relative to that in the first part 3362A. A cathode outlet manifold 3364 collects the reactant that has passed through each of the fuel cells in the first group 3001 and passes the reactant to a cathode exhaust 3365. As with the anode flowpath, inlet and outlet valves 1300, 1400 can be used to regulate reactant delivery, flowpath purging, back pressure or the like.

Referring next to FIG. 5, a schematic representation of anode and cathode flowpaths and an anode recirculation loop 2000 coupled to fuel cell stack 3000 is shown. As mentioned above, if a relatively small number of stages (such as the two shown) are being employed in a cascaded design, higher levels of anode reactant flow are needed to ensure adequate hydration of the electrolytes that are each disposed between an anode and cathode in the MEA. This is due, at least in part, to the limited ability of the relatively dry reactant in the inlet manifold 3361 of the cathode flowpath 3360 to contribute to electrolyte hydration. The high anode flow includes with it a concomitant increase in moisture, as additional product water formed by diffusion, pressure gradients and related phenomena finds its way into the anode flowpath 3160. The use of the anode recirculation loop 2000 allows the fuel cell stack 3000 to simulate the larger anode reactant flow with a relatively small amount of anode reactant. This facilitates electrolyte hydration without suffering the hydrogen utilization and related efficiency penalties associated with maintaining a large anode reactant flow. With proper conduit, valving and control, water built up in the anode flowpath 3160 can be used to not only hydrate the electrolytes 320 within each individual fuel cell 300, but to increase the humidification of the cathode flowpath 3360, reducing or eliminating the need for supplemental humidification. A safety valve 2100 is included to provide over-pressure relief to the system. In situations in system 1 where the fuel flow rate in the anode flowpath 3160 is held constant (such as through constant level of pumping), the recirculation rate as a percentage of total fuel flow will vary with the power demands placed on the stacks 3000. For example, at full power the recirculation rate for a given, fixed pump may be ten percent when the fuel consumption rate is at maximum. At minimum power level, where the rate of fuel consumption is very low, the recirculation percentage becomes very large, as the recirculation rate equals the ratio of recirculated fuel flow to total fuel consumed. In this regard, the percentage of recirculation needed is based on the amount of water that has to be moved through the anode. The conduit, valving and control can be combined to manipulate the recirculation rate in order to achieve a desired amount of water movement, and such manipulation based on specific parameters are discussed in more detail next.

Certain operational parameters are preferably controlled, including the amount of air fed into the cathode flowpath 3360 and the relative humidity of the fluid exiting the cathode outlet manifold 3364. In addition, there are numerous measured values taken from sensors S, including reactant and reaction product pressures and temperatures. Moreover, other parameters, such as coolant temperature, can be adjusted in response to measured conditions. A controller (such as a programmable logic controller) 2500 can be used in conjunction with sensors S or the like to monitor parameters and send out appropriate commands on an as-needed basis to adjust system operation. It will be appreciated by those skilled in the art that sensors S may include be either direct sensing devices or model-based devices, where the latter arise from indirect measurements made on other parameters. For example, pressure sensors S may be configured such that the sensed pressure value is derived from compressor flow rates and temperatures rather than from a direct pressure measurement. Either form is applicable to the present disclosure. Incoming signals (such as measured or sensed values) 2510 can be used by a predetermined logic built into controller 2500 to provide control signals 2520 to pumps P1, P2 and P3, valves 1000, 1100, 1200, 1300 and 1400 or other components, which in turn can be used in conjunction with heat exchangers H1, H2 and H3 to control flows, temperatures, pressures of the fluids used in the anode, cathode and cooling paths. By way of example, heat exchanger H3 may be an automotive radiator, while heat exchangers H1 and H2 are coupled with the stack coolant system 700 so that the reactants are at substantially the same temperature as the stack 3000. As shown in the figure, heat exchanger H3 may form part of the stack's cooling system 700, shown as cooling loop 800, with branch 900 that is in heat exchange relationship with H1 of the anode flowpath 3160. Collectively, the pumps, valves, conduit and heat exchangers make up the BOP 2700 that cooperates with controller 2500 to manage the distribution of water within stack 3000. For example, the controller could be used to sense a humidity level and, based on a predetermined algorithm, adjust coolant flows to ensure coolant inlet and outlet temperatures necessary to promote a substantial balance in water flow between the anode and cathode groups of the cascaded stack 3000 to establish proper levels of cathode exhaust relative humidity. In this regard, the valves 1000, 1100, 1200, 1300 and 1400 are controlled by an actuation source responsive to a predetermined control signal from controller 2500 that is based on one or more sensed parameters. By way of another example, pump P1 can be a recirculation pump for the anode flowpath 3160.

In operation, a desired current load on stack 3000 will dictate the desired amount of airflow through the first and second groups 3001, 3002 of stack 3000. Sensor measurements of one or more of pressure, temperature and relative humidity can be used by controller 2500 to estimate the mole fractions of water in the cathode outlet manifold 3364. For example, coolant temperature can be measured. These measurements are used by algorithms built into the controller to allow it to conduct a mass balance. After this, the cathode exhaust relative humidity set point is compared (using, for example, coolant temperatures) to ensure the desired cathode relative humidity. In this way, the coolant temperatures are used to control the relative humidity of the cathode exhaust, thereby ensuring a preferred level of hydration.

As mentioned above, in order to determine the proper operating conditions of a cascaded fuel cell stack, there are certain parameters that need to be quantified and operated upon. The following example (assuming a two stage (i.e., two group) stack 3000 with first and second groups 3001, 3002 as shown in FIGS. 2 through 5) highlights some of the parameters that are measured, calculated and used to control anode recirculation flow. First, the cathode feed streams are determined using the following equations:

$$Cath1_{air} = \lambda_{C1} \frac{I * \#Cells_1}{4 * Fa} * \frac{MWO_2}{AirMassFracO_2} \quad (1)$$

$$Cath2_{air} = \left( \lambda_{C2} \frac{I * \#Cells_{cath2}}{4 * Fa} - (1 - \lambda_{C1}) \frac{I * \#Cells_{cath1}}{4 * Fa} \right) * \frac{MWO_2}{AirMassFracO_2} \quad (2)$$

where $Cath1_{air}$ and $Cath2_{air}$ is the mass flow of air through the first and second cathode groups respectively, Fa is the Faraday number and $\lambda_{C1}$ and $\lambda_{C2}$ are the stoichiometries of the first and second cathode groups respectively. It can be seen from Eqn. (2) above that the amount of air required for the second cathode group is determined by subtracting the unused oxygen from the first group from the total amount of oxygen needed. After the cathode flows are calculated, the anode flow can be determined:

$$An_{H2} = \lambda_{An} \frac{I * \#Cells}{2 * Fa} \quad (3)$$

where $An_{H2}$ is the mass flow of hydrogen fuel used as feedstock for the anode flowpath, and $\lambda_{H2}$ is the overall stoichiometry of the flow of hydrogen fuel into the anode. As mentioned above, pressures, including those at the cathode outlet manifold 3364, first group cathode out (measured at either the first or second parts 3362A, 3362B of the intermediate manifold 3362) and first group cathode in (measured at the cathode inlet manifold 3361), need to be sensed. A pressure regulator (in the form of a biased pressure reducing valve) 1000 can be included in the anode recirculation loop 2000 so that the pressure therein is biased to the cathode inlet (which is the same as first group cathode in) pressure. It is desirable to manage the membrane water hold-up by controlling the cathode relative humidity with temperature. Accordingly, Antoine's Equation can be used to determine the appropriate coolant temperature:

$$T = \frac{B}{A - \log_{10} \frac{[H_2O] * P_{tot}}{RH}} - C \quad (4)$$

where A, B and C are constants for the temperature range of interest in a PEM fuel cell, $P_{tot}$ is the total sensed pressure at the cathode exit, RH is the relative humidity (which can be provided as a desired quantity, for example, in a lookup table) and $[H_2O]$ is the molar fraction of water in the cathode outlet manifold 3364. To determine the coolant temperature, we must first find the molar fraction of water. For example, starting with the fluid stream in the cathode outlet manifold 3364, which is equal to the cathode feed air plus product water generated less the oxygen consumed, where the cathode feed air is the sum of feed air from the two cathode groups 3001, 3002.

$$\dot{n}_{dry\_gas\_out} = \dot{n}_{O_2} - \dot{n}_{O_2\_consumed} + \dot{n}_{N_2} \quad (5)$$

From before, the amount of oxygen consumed can be shown as:

$$\dot{n}_{O_2\_consumed} = \frac{I * \#Cells}{4 * Fa} \quad (6)$$

while the amount of oxygen in can be shown as:

$$\dot{n}_{O2} = \frac{Cath_{air}}{MW_{air}} * mf_{O2} \quad (7)$$

and the amount of nitrogen out is shown as:

$$\dot{n}_{N2} = \frac{Cath_{air}}{MW_{air}} * mf_{N2} \quad (8)$$

where $mf_{O2}$ and $mf_{N2}$ are the respective molar fractions of oxygen and nitrogen. The amount of water exiting the system is:

$$\dot{n}_{H_2O} = \frac{I * \#Cells}{2 * Fa} \quad (9)$$

while the corresponding molar fraction is:

$$[H_2O] = \frac{n_{H_2O}}{n_{H_2O} + n_{dry\_gas}} \quad (10)$$

where $n_{gas}$ is the aforementioned dry gas flow in the cathode exhaust flowpath. Once these quantities are determined, the coolant inlet temperature from Eqn. (4) can be determined. This value of coolant inlet temperature establishes a set point that controller 2500 can use to manipulate one or more components of BOP 2700 to ensure that this temperature condition is maintained. Once this appropriate coolant inlet temperature is determined, the coolant outlet temperature can be calculated. Using Eqn. (6) from above, the amount of oxygen consumed for the first group cathode can be determined. Similar use of Eqns. (7) and (8) can be made to generate the molar flow of gas exiting first group cathode out at the intermediate manifold 3362 when inserted into Eqn. (5). As stated earlier and shown with particularity in FIG. 5, the first group cathode out (corresponding to first part 3362A) at the intermediate manifold 3362 may include supplemental air from cathode reactant inlet valve 1200 to produce a fluid in second part 3362B. The supplemental air comes from a compressor (not shown) and is controlled by a mass flow sensor and valve that together cooperate with controller 2500. Likewise, Eqn. (9) is used again to determine the amount of product water. This is then added to the amount of water transferred to the cathode 330 from the anode 310 through diffusion through the electrolyte membrane of each individual fuel cell 300 as shown in FIG. 1B. An example of an anode model that can be used to determine the anode gas mole fractions can be found in commonly-assigned U.S. patent application Ser. No. 10/780,489 entitled FUEL CELL SYSTEM BURP CONTROL, filed Feb. 17, 2004 and published on Aug. 18, 2005 as Published Application Number 2005/0181249, herein incorporated by reference. This model describes the algorithm used to determine the anode water flow through the cascaded stack 3000. If it is assumed that the water entering is balanced with the water exiting, and that the total amount of water exiting is equal to the amount going to exhaust, recirculation and transfer to cathode (see, for example, FIG. 5), the amount of water exiting first group cathode out at the first part 3362A of the intermediate manifold 3362 can be found by subtracting from the amount entering the amount going to anode exhaust and recirculation.

Next, to determine how much of the hydrogen fuel is flowing at the first and second groups, the following anode equation is used to determine the flow of fuel leaving the first group 3001 and entering the second group 3002:

$$An_{in} = H_{2\_consumed} + H_{2\_bleed} + H_{2\_recirc} \quad (11)$$

Here, Eqn. (9) can be used to show the amount of hydrogen consumed in the second group 3002, while the amount of hydrogen bled off can be determined by:

$$H_{2\_bleed} = H_{2\_consumed}(\text{overall\_stoich} - 1) \quad (12)$$

which in turn allows us to determine the anode recirculation flow rate:

$$H_{2\_recirc} = H_{2\_consumed}(\text{recirculation\_stoich} - 1) \quad (13)$$

From this, we determine the anode hydrogen flow rate from the first and second groups 3001, 3002 as:

$$H_{2\_stg1-stg2} = H_{2\_consumed\_san\_stg\_2} + H_{2\_recirc} + H_{2\_bleed} \quad (14)$$

The anode model (discussed above and incorporated by reference), gives us the molar fraction of the gases. From this, we can solve for the total flow rate:

$$\dot{n}_{H_2} = \dot{n}_{total} * mf_{H_2} \quad (15a)$$

which can be rearranged as:

$$\dot{n}_{total} = \frac{\dot{n}_{H_2}}{mf_{H_2}} \quad (15b)$$

from this, the anode gas flow rate from the first group 3001 to the second group 3002 is solved. This can then be used to solve for the water flow rate into the second anode group 3002:

$$\dot{n}_{H_2O} = \dot{n}_{total} * mf_{H_2O} \quad (16)$$

Again, if we are to maintain the stack as water neutral (i.e., water entering equals water leaving), and we assume that the water leaves at three locations (as noted in FIG. 5): the anode bleed valve 1100, the recirculation pump P1 and across the membrane to the cathode of each of the fuel cells 300 in stack 3000:

$$\dot{n}_{H_2O\_anode\_in} = \dot{n}_{H_2O\_bleed} + \dot{n}_{H_2O\_recirc} + \dot{n}_{H_2O\_to\_cath} \quad (17)$$

where the anode model referenced above can be used to get the molar fraction at the exhaust. After this, repeated applications of Eqns. (15b) and (16) are used to solve for the water flow rate at the bleed valve 1100 and due to recirculation. The relief valve 2100 is for over-pressure safety, while the anode bleed valve 1100 (as previously discussed) can be used in conjunction with inlet valve 1000 to regulate reactant delivery, back pressure and flowpath purging, among other things. With that, the water transported to the cathode can be figured by rearranging Eqn. (17). Once this has been determined, the coolant outlet temperature set point may be calculated, whereby recalling that the outlet flow from the first cathode group is equal to the air provided to group one of the cathode less the oxygen consumed plus the water added, a total gas flow exiting the first cathode group is found. Noting that the outlet water stream of the first group cathode (i.e., first group cathode out at the first part 3362A of the intermediate manifold 3362) is the product water formed, which was calculated from Eqn. (9), plus the water transferred from the anode to the cathode, the total water is found from:

$$\dot{n}_{H_2O\_cath1\_total} = \dot{n}_{H_2O\_cath1\_product} + \dot{n}_{H_2O\_anode\_to\_cath1} \quad (18)$$

From this, the mole fraction of water can be found from Eqn. (10). This, in turn, can be inserted into Eqn. (4) to determine the coolant outlet temperature setpoint for a desired first group cathode RH.

A specific example will serve to demonstrate the foregoing discussion. In it, a two group fuel cell stack is made up of ninety three individual cells within group 3001 and thirty two individual cells within group 3002. In the first group 3001, the anode flow is co-flow with coolant and the cathode flow is counterflow to the coolant, while in the second group 3002, the anode flow is counterflow to the coolant and the cathode flow is co-flow to the coolant. Each of the electrolytes 320 are twenty five microns thick, and cover four hundred square centimeters, permitting 0.8 amps per square centimeter, for a total of three hundred twenty amps. If the cathode stoichiometries of the groups are 2.0 and 2.1 (which are based on some pre-determined desired values), and Faraday's number is 96484 coulombs per mole, then Eqn. (1) results in 7.3 grams per second, while Eqn. (2) results in 18.69 grams per second. If an anode stoichiometry is assumed to be 1.02, then the anode feed as determined by Eqn. (3) is 0.207 moles per second. If cathode exhaust, cathode first group out and cathode first group in pressures are measured by the appropriate sensors S as 135.6 kPa, 158 kPa and 176.3 kPa respectively, and (as previously mentioned) the anode is biased to the cathode, then Eqn. (4) results in (assuming the constants A, B and C from Antoine's equation are 7.96681, 1668.21 and 228 respectively) a coolant inlet temperature of 67.4 degrees Celsius. This is based on Eqns. (6) through (8), which results in 0.1036 moles per second, 0.19 moles per second and 0.713 moles per second. Inserted into Eqn. (5), the total dry gas exiting the cathode exhaust is 0.799 moles per second. Eqn. (9) indicates 0.207 moles per second of water outflow, which is 0.205 in molar fraction. Placing all these into Eqn. (4) (where a relative humidity setpoint of one hundred percent is assumed), leads to the aforementioned 67.4 degrees Celsius. Next, the coolant outlet temperature may be determined as follows.

The flow rate of oxygen consumed in the smaller group is taken from Eqn. (6), resulting in 0.02653 moles per second, while the oxygen in (taken from Eqn. (7)) is 0.0531 moles per second. The amount of nitrogen exiting the smaller cathode group is derived from Eqn. (8), and is 0.2013 moles per second, while the molar flow of dry gas out of the cathode is 0.2283 moles pr second. The product water (taken from Eqn.

(9)) is 0.531 moles per second. Now, if the anode recirculation rate is set at eight percent, and the overall anode stoichiometry is 1.02 (as previously stated), then the amount of hydrogen consumed is 0.207 moles per second. Since in situations where the system is water-neutral, anode flow exiting the first group is equal to the anode flow entering the second group, Eqns. (11) through (14) (in conjunction with Eqn. (9)) gives us 0.737 moles per second, made up of 0.531 moles per second of consumed hydrogen, 0.00406 moles per second of hydrogen bled off, and 0.0166 moles per second of recirculated hydrogen. By using the anode model discussed in the incorporated reference, Eqns. (15a) and (15b) are used to indicate that the anode gas flow rate from the first to second groups is 0.0913 moles per second. Eqn. (16) is used to solve for the water flow rate into the second anode group, amounting to 0.0158 moles per second. If we assume that the water leaves the anode at the bleed valve, recirculation pump and across the electrolyte and into the cathode, then Eqn. (17) can be solved using Eqns. (15b), (16) repeatedly to give the molar flowrate at the exhaust of 0.00537 moles per second, and a related water flow rate at the bleed valve of 0.000926 moles per second, as well as the molar flowrate at the recirculation pump of 0.0219 moles per second, and a related water flow rate at the bleed valve of 0.00379 moles per second. Then Eqn. (17) reveals the flow rate of 0.0116 moles per second from anode stage 2 to cathode stage 1. With this information, the coolant outlet temperature set point may be figured. Recalling that oxygen consumed was 0.02653 moles per second, and that oxygen in was 0.0531 moles per second, and that nitrogen exiting the first cathode group was 0.2013 moles per second, then recalling that the total dry gas out was 0.2283 moles per second and that the total product water was 0.0531 moles per second, then Eqn. (18) reveals that the total water is equal to the product water plus the anode water, and is equal to 0.06411 moles per second, with a molar fraction of 0.22. Eqn. (4) shows that such an arrangement results in a coolant outlet temperature setpoint of 72.46 degrees Celsius. Because the system is exothermic and the temperature rise is in the same direction as the coolant flow, these coolant setpoint values are readily achievable with the disclosed coolant subsystem.

While certain representative embodiments and details have been shown for purposes of illustrating the invention, it will be apparent to those skilled in the art that various changes may be made without departing from the scope of the invention, which is defined in the appended claims.

What is claimed is:

1. A cascaded fuel cell system comprising:
a stack comprising a plurality of individual fuel cells, each of said individual fuel cells comprising a membrane electrode assembly, an anode, an anode flowpath fluidly coupled to said anode, a cathode, and a cathode flowpath fluidly coupled to said said plurality of individual fuel cells defining:
a first group comprising a portion of said individual fuel cells, said first group arranged such that:
said anode flowpath and said cathode flowpath are in counterflow relationship relative to one another,
a concentration of reactants delivered to each of said individual fuel cells therein is substantially equal,
a first group anode inlet is fluidly coupled to a fuel source, and
a first group cathode inlet is fluidly coupled to a second group cathode outlet; and
a second group comprising the remainder of said individual fuel cells, said second group arranged such that:
said anode flowpath and said cathode flowpath are in counterflow relationship relative to one another,
a concentration of reactant delivered to each of said individual fuel cells is substantially equal,
a second group anode inlet is fluidly coupled to a first group anode outlet, and
a second group cathode inlet is fluidly coupled to an oxygen source;
a fresh reactant supply comprising a supplemental oxygen source fluidly coupled to said cathode flowpath between said first group and said second group;
a cooling loop thermally coupled to said stack between a coolant inlet to said stack and a coolant outlet from said stack;
a first temperature sensor for measuring a coolant-inlet temperature;
a second temperature sensor for measuring a coolant-outlet temperature;
a recirculation loop fluidly coupled to said anode flowpath;
a recirculation pump fluidly coupled to said recirculation loop; and
a controller cooperative with said recirculation pump, said first temperature sensor, and said second temperature sensor, such that said controller determines a relative humidity of a cathode exhaust as a function of said coolant-inlet temperature and said coolant-outlet temperature and, based on a predetermined set-point value for said relative humidity, directs said recirculation pump to cycle at an anode recirculation rate an amount of water-rich anode effluent from the second group anode outlet toward fuel flowing into said first group anode inlet, so as to promote a predetermined amount of membrane electrode assembly hydration.

2. The cascaded fuel cell system of claim 1, wherein said second group contains fewer individual fuel cells than said first group.

3. The cascaded fuel cell system of claim 1, wherein said cooling loop is configured in said stack such that the cooling loop is in a co-flow relationship with the anode flowpath in the first group and in a counterflow relationship with the anode flowpath in the second group.

4. The cascaded fuel cell system of claim 1, further comprising:
an anode-side heat exchanger thermally coupled with said cooling loop and said first group anode inlet for adjusting the temperature of said fuel entering the stack to substantially the same temperature as the stack; and
a cathode-side heat exchanger thermally coupled with said cooling loop and said second group cathode inlet for adjusting the temperature of said oxygen entering the stack to substantially the same temperature as the stack.

5. The cascaded fuel cell system of claim 1, wherein the cathode flowpaths in each group each comprise a cathode inlet manifold, and the anode flowpaths in each group each comprise an anode inlet manifold, each of the cathode inlet manifolds and each of the anode inlet manifolds being arranged in a substantially equal parallel pattern so as to deliver the concentrations of reactants substantially equally to each of said individual fuel cells in each respective group.

* * * * *